Nov. 29, 1955 — M. A. THORNE — 2,725,122
HYDRAULIC LINE SEAL

Filed July 29, 1953 — 2 Sheets-Sheet 1

INVENTOR
Maurice A. Thorne
BY
John T. Mann
Their Attorney

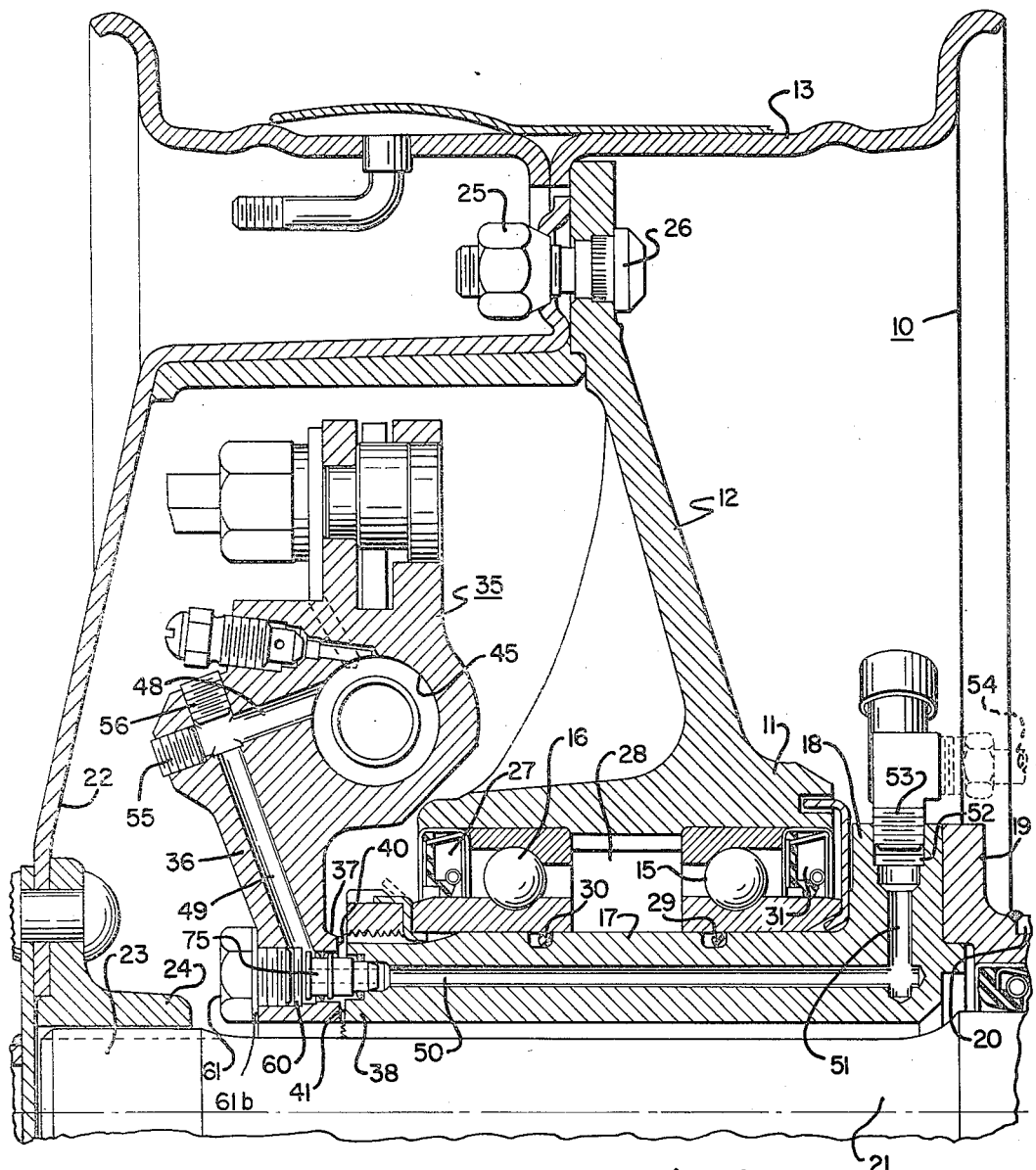
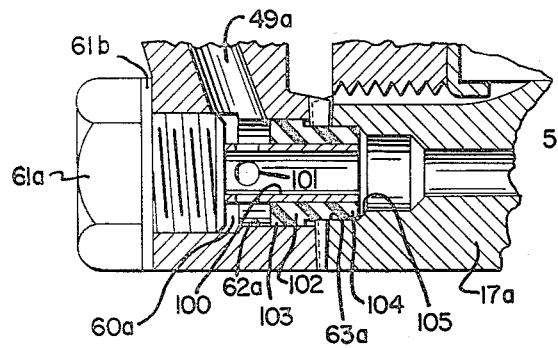
Fig. 2
Fig. 4
INVENTOR
Maurice A. Thorne
BY
John T. Mann
Their Attorney

United States Patent Office 2,725,122
Patented Nov. 29, 1955

2,725,122

HYDRAULIC LINE SEAL

Maurice A. Thorne, Detroit, Mich., assignor to General Motors Corporation, Detroit, Mich., a corporation of Delaware Application July 29, 1953, Serial No. 371,030

2 Claims. (Cl. 188—152)

This invention relates to a seal structure adapted for sealing the juncture between substantially aligned discontinuous hydraulic line passages, which may particularly be applied to a wheel structure in which there exists a joint in the hydraulic fluid line to the brake incorporated in the wheel structure.

At the present time the major number of wheel structures used on automotive vehicles have the brake assemblies incorporated in the wheel structure in a manner that it is necessary to service the brake assembly from the inboard side of the wheel. In such arrangements it is possible to connect the hydraulic lines for the hydraulic brakes directly to the supporting structure for the brake assembly, it only being required that a fitting be provided on the inlet side of the passageways.

However, it is desirable that the brake assemblies incorporated in the wheels of automotive vehicles be serviceable from the out-board side of the wheel, rather than from the in-board side.

When a brake assembly is positioned on the out-board side of a wheel structure, it means that the brake assembly is carried upon the wheel spindle at its furthermost projecting end, and, for reasons of assembly, is usually separate from the wheel spindle. Thus, a joint is created between the supporting spider or structure for the brake assembly and the wheel spindle.

The usual arrangement for conducting hydraulic fluid to the wheel cylinders of the brakes in such a structure includes a fitting threaded directly into the hydraulic line passages that extends through the spindle from which a tube extends to another fitting provided on the brake assembly for connection with the hydraulic wheel cylinder that actuates the brakes. Such arrangements however are not satisfactory because of the number of parts involved, leading to additional cost of manufacture as well as cost of assembly.

It is therefore an object of this invention to provide a seal member to bridge the joint between a passage incorporated in the brake mounting spider and a passage incorporated in the wheel spindle of a wheel structure that has a brake assembly positioned on the out-board side of the wheel structure.

It is another object of the invention to provide an improved seal structure for bridging a joint between discontinuous substantially aligned hydraulic line passages wherein the seal structure has hydraulically unbalanced areas exposed to line pressure whereby to urge the seal toward a particular sealing position when fluid pressure develops in the hydraulic line passages.

Further objects and advantages of the present invention will be apparent from the following description, reference being had to the accompanying drawings wherein a preferred form of the invention is clearly shown.

In the drawings:

Figure 2 is a cross sectional view taken substantially along line 2—2 of Figure 1.

Figure 4 is a cross sectional view similar to Figure 3 but illustrating a modified form of a seal placed in a brake line passage.

Figure 1:
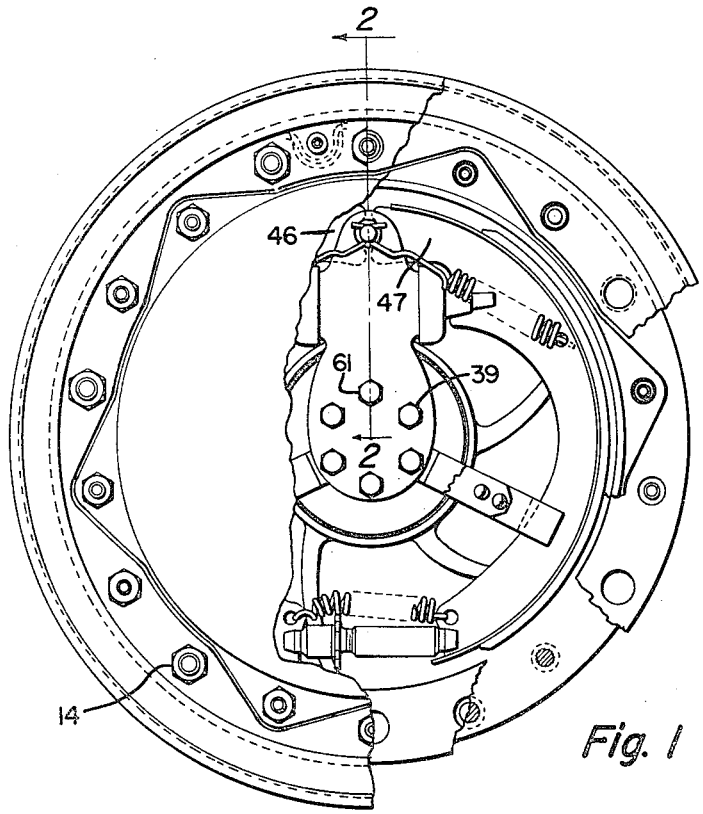
Figure 1 is an elevational view of a brake structure incorporating features of this invention.

In this invention the seal structure is illustrated as applied to a wheel structure of a motor vehicle incorporating a hydraulic brake in the structure.

As illustrated in the drawings, the wheel structure comprises a wheel 10 including a hub 11, and a hub flange 12. A tire rim 13 is mounted on the hub flange in any suitable manner, the wheel nuts 14 retaining the rim 13 on the hub flange 12.

The hub 11 of the wheel 10 is carried upon the in-board bearing 15 and the out-board bearing 16, the bearings 15 and 16 in turn being carried upon a spindle 17 that has a radial flange portion 18 that is mounted to a radial flange portion 19 of the axle housing 20. An axle 21 extends from the differential of the automotive vehicle and through the axle housing 20 and the spindle 17 to receive a brake drum 22 mounted on the forward or out-board end 23 of the axle 21 by a splined connection between the end 23 of the axle and the hub 24 on the brake drum 22. The brake drum 22 is secured to the wheel hub flange 12 by means of the nuts 25 threadedly received on the studs 26.

A grease seal 31 is provided adjacent the in-board bearing 15 and a similar grease seal 27 is provided adjacent the out-board bearing 16 to prevent grease leakage from within the chamber 28 housing the bearings 15 and 16. An O ring seal 29 is placed within an annular groove in the spindle 17 to engage the inner race of the in-board bearing 15 to prevent grease leakage between the contacting surfaces. A similar O ring 30 is provided in another annular groove in the spindle 17 and in engagement with the inner race of the out-board bearing 16.

A brake assembly 35 is positioned on the out-board side of the hub flange 12, and is thus confined between the hub flange 12 and the brake drum 22. The brake assembly 35 includes a mounting structure or mounting spider 36 that has a hub 37 positioned against the forward end 38 of the spindle 17 and secured thereto by bolts 39 extending through the hub 37 into threaded engagement with suitable threaded holes in the spindle 17. Preferably, the rear face 40 of the hub 37 is provided with radial serrations, comparable radial serrations 41 being provided on the forward end of the spindle 17 whereby intermeshing of the serrations prevents rotation of the brake spider 36 relative to the spindle 17.

The brake assembly 35 includes a chamber forming wheel cylinder 45 that receives hydraulic fluid under pressure for actuation of the brake shoes 46 and 47 of the brake assembly 35 in conventional manner. The wheel cylinder 45 is supplied with fluid under pressure from the master cylinder of the hydraulic brake system through the passages 48 and 49 that are incorporated in the brake spider 36, as drilled passages. The passage 49 is connected with a passage 50 provided in the spindle 17, the passage 50 in turn being connected with a radial passage 51 in the flange 18 of the spindle 17. The passage 51 terminates in a threaded portion 52 that threadedly receives a fitting 53 that in turn is connected to the master cylinder of the brake system through the conduit or pipe 54.

The drilled passage 48 is closed at one end by the threaded plug 55, a similar threaded plug 56 being provided to close the end of the drilled passage 49.

The passage 49 in the brake spider 36 has one end thereof terminating in the chamber 60 provided in the hub 37 of the brake spider, the chamber 60 being axially aligned with the passage 50 in the spindle 17. The chamber 60 is closed at its outer end by a threaded plug 61 and a gasket 61b. The chamber 60 also includes a smooth walled bore 62 that extends to the face 40 of the hub 37, this bore 62 being axially substantially aligned with a smaller diameter bore 63 provided in the spindle 17. The bore 63 extends inwardly from the face 41 of the end of the spindle 17 and terminates in a smaller diameter bore 64 thereby providing a radial shoulder 65 between the bores 63 and 64.

A spool 75 is received within the bores 62 and 63 and includes a cylindrical body portion 76 of somewhat smaller diameter than that of the bore 63, the body portion 76 spanning the joint created between the faces 40 and 41 on the spider hub 37 and the end 38 of the spindle 17. The body portion 76 of the spool 75 has a reduced diameter portion 77 that partially extends into the bore 64 in the spindle 17 thereby creating a chamber 78 that receives an O ring 79.

At the opposite end of the body 76 of the spool 75 there is provided the annular rings 80 and 81 of substantially the same diameter and of a diameter just slightly less than that of the bore 62 that receives the annular rings 80 and 81, the annular rings 80 and 81 also being of a larger diameter than the body 76 of the spool 75. Thus, an annular recess 82 is provided between the annular rings 80 and 81 that receives an O ring 83. It will be noted that the chamber 78 and the O ring 79 received therein is smaller in diameter than the bore 62 and the O ring 83 retained within the annular recess 82. Further, it will be noted that the reduced diameter portion 77 of the spool 75 is of considerably lesser diameter than the head of the spool 75 formed by the annular ring 81. Thus, the spool 75 is hydraulically unbalanced so that equivalent pressures standing in the chambers 60 and 63 will cause the spool 75 to move in a rightward direction as viewed in Figure 3. An axial passage 90 extends through the spool 75 to conduct fluid from the passage 50 to the chamber 60 and thus to the passage 49.

The normal function of the seal formed by the spool 75 and the O rings 79 and 83 is such that the hydraulic unbalance of the spool 75 will cause it to move in a rightward direction against the O ring 79 and thereby provide an effective pressure seal between the spool 75 and the spindle 17. The O ring 83 is exposed to the hydraulic pressure in the chamber 60 thereby causing it to move against the annular ring 80 and seal against this ring and against the surface of the bore 62. As the pressure increases in the chamber 60 and in the passage 49 the effective sealing of the O ring 83 increases as does the pressure sealing of the spool 75 against the O ring 79.

It will thus be seen that the construction provided in this invention permits all of the passages for conducting fluid under pressure from the master cylinder of the brake system to the wheel cylinder of the brake assembly to be incorporated directly in the physical structures of the wheel spindle 17 and the brake spider 36, an effective seal consisting of the spool 75 and the O rings 83 and 79 being provided to span the joint created between the brake spider 36 and the spindle 17.

In Figure 4 there is illustrated a slightly modified arrangement of the seal member. The brake spider and the spindle are constructed in the same manner as previously described so that the elements that correspond to those of the previous description will bear the same reference numerals but with the suffix "a."

In the modification shown in Figure 4 the seal member consists of a tubular member 100 that has cross drilled passages 101 therein. A resilient rubber-like seal member 102 is bonded to one end of the tube 100 and has one portion 103 thereof engaging the bore 62a of the chamber 60a.

The seal member 102 also has a reduced diameter portion 104 that engages the bore 63a of the spindle 17a.

The seal member of the modification of Figure 4 functions in substantially the same manner as the seal member heretofore described in that the portion 103 of the seal member is of larger diameter than the portion 104, thereby hydraulically unbalancing the seal member to the extent that equivalent pressures in the passages 49a and 50a cause the seal member to move in a rightward direction to urge the forward end of the seal portion 104 against the wall 105 of the bore 63a. Also, increasing pressure in the chamber 60a causes the resilient seal member 102 to more forcefully engage the bores 62a and 63a.

Figure 3:
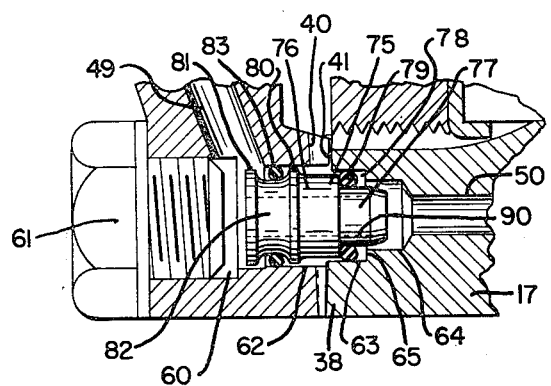
Figure 3 is an enlarged cross sectional view of the seal provided in the brake line passage.

It will of course be understood that both seal members illustrated in Figures 3 and 4 normally provide for fluid sealing across the joint between the brake spider 36 and the spindle 17 without the effect of the fluid pressure heretofore discussed, the seal members being dimensioned such that there is a primary frictional seal provided between the resilient rubber-like O rings 83 and 79 and the bores 62 and 63 and between the seal member 102 and the corresponding bores 62a and 63a. The frictional seal provided is sufficient to prevent loss of hydraulic fluid from the passages in the brake spider and the spindle at low fluid pressures, but the effectiveness of the seal is increased as the fluid pressure is increased in the hydraulic brake lines.

While the form of embodiment of the invention as herein disclosed constitutes a preferred form, it is to be understood that other forms might be adopted as may come within the scope of the claims which follow.

What is claimed is as follows:

1. In a wheel structure having a spindle mounting a wheel with a fluid operated brake assembly for the wheel mounted separately on the spindle, the spindle being provided with a fluid line passage that substantially aligns with a fluid line passage in the brake assembly for conducting fluid to the actuating device of the brake assembly, a seal assembly extending between the said line passages and bridging a joint therebetween, a first chamber means in the end of one of the line passages at the joint between the said passages, a second chamber means in the end of the other line passage at the joint between the said passages of smaller diameter than the first chamber, a core having a smooth tubular exterior surface disposed within said chambers having a passage through the same interconnecting said line passages, a resilient annular seal member on said core having a first large diameter portion engaging the wall of the first chamber and a second smaller diameter portion engaging the wall of the second chamber.

2. In combination, two disengageable members each having a fluid line passage therein, said fluid line passages substantially coaxially aligning when said members are in adjacent position with the fluid line passages substantially coextending, the line of division between said two members effecting a joint between the said passages, one of said members having a first chamber means in the end of the line passage therein at the joint between the said passages, the other of said members having a second chamber means in the end of the line passage therein at the joint between the said passages and of smaller transverse cross section than the first chamber means, a core within said chambers having a passage through the same interconnecting said line passages, and a resilient seal member on said core having a first portion of large transverse cross section engaging the wall of the first chamber and a second portion of smaller transverse cross section engaging the wall of the second chamber.

References Cited in the file of this patent

UNITED STATES PATENTS

| | | |
|---|---|---|
| 813,454 | Schaad | Feb. 27, 1906 |
| 951,704 | Schmidt | Mar. 8, 1910 |
| 2,408,938 | MacPherson | Oct. 8, 1946 |

FOREIGN PATENTS

| | | |
|---|---|---|
| 28,930 | Great Britain | Dec. 10, 1909 |
| 561,349 | Great Britain | May 16, 1944 |
| 578,408 | Germany | June 13, 1933 |